Feb. 2, 1971 C. S. BLAIR 3,559,324

TRANSFERABLE TAPE REEL IDENTIFICATION DISK

Filed May 27, 1968

INVENTOR.
CHARLES S. BLAIR

BY Julian Caplan

ATTORNEY

United States Patent Office 3,559,324

Patented Feb. 2, 1971

3,559,324 TRANSFERABLE TAPE REEL IDENTIFICATION DISK

Charles S. Blair, % 5th Ave. Rental, 101 5th Ave., Redwood City, Calif. 94061

Filed May 27, 1968, Ser. No. 732,132
Int. Cl. G09f *3/00*
U.S. Cl. 40—309 1 Claim

ABSTRACT OF THE DISCLOSURE

Transfer of data identifying material recorded on tapes for recorders is accomplished by this invention when the tapes are wound from one reel to another. A disk carries the identifying indicia and is provided with means detachably securing same to a reel so that when a tape is transferred from one reel to another the disk may be conveniently removed from the first reel and installed on the second.

This invention relates to a new and improved transferable tape reel identification disk. Tape recorder reels are of substantially standard size and construction. In use of tape recorders, frequently tape is transferred from one reel to another and rewound back to the initial reel. Identification of the contents of the tape thus becomes difficult. It is a principal object of the present invention to facilitate tarnsfer of identification means from one reel to another when the tape is transferred.

A principal further object of the present invention is the facility with which the identification may be transferred from one reel to the next.

Still another feature and advantage of the invention is the fact that no alteration of the reel construction is required in order to use the present invention.

Other objects of the present invention will become apparent upon reading the following specification and referring to the accompanying drawings in which similar characters of reference represent corresponding parts in each of the several views.

Figure 1:
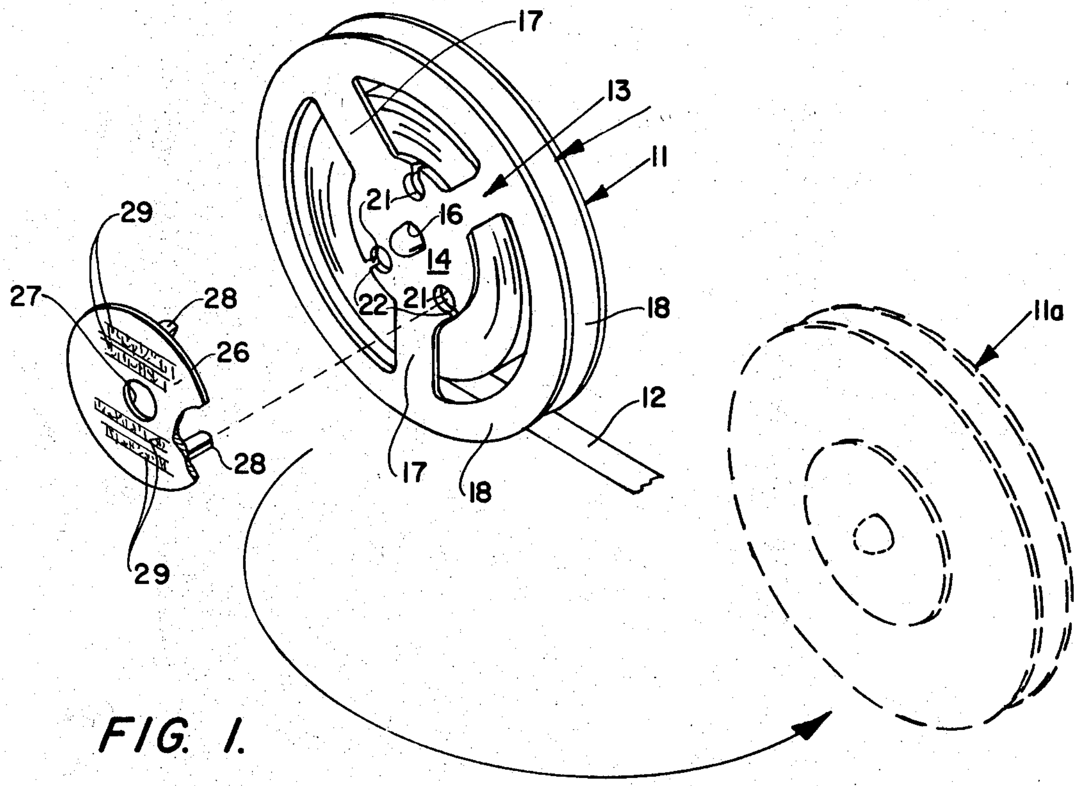
FIG. 1 is an exploded perspective view of a tape reel and identification disk, also showing transfer of the disk from one reel to the other.

As illustrated in FIG. 1, a tape recorder reel 11 has a center spool (not shown) around which recording tape 12 is wound. Reel 11 has spaced, opposed sides 13 between which tape 12 is disposed. Sides 13 are formed with a central hub formed with an aperture 16 for the recorder spindle. Radiating from hub 14 are spacer arms 17 and around the perimeter of the side 13 is a rim 18. Reels 11 of the type shown in FIG. 1 are conventionally formed with three holes 21 equally spaced from but adjacent the outside of hub 14. Extending radially from each hole 21 is a key-hole slot 22. Holes 21 and slots 22 are conventionally formed in such reels to facilitate installation of tape 12 and their special fabrication is not required in order to practice the present invention.

In the form of the invention shown in FIG. 1, a disk 26 is provided formed with an aperture 27 which registers with the aperture 16. On the back of disk 26 are prongs 28 shaped and positioned to fit into the three holes 21 and frictionally engage the margins of the holes so as to hold the disk 26 in place against unintentional dislodgment, but to permit the user to pull the disk 26 off the reel when desired. On the front of disk 26 are indicia 29 which are subject to considerable variation. Thus the indicia may include the name of the manufacturer of the tape, the name of the selection recorded thereon, identification of artists, composers, and the like, and meter readings to facilitate location of particular selections where a plurality of selections are recorded on the tape.

In use, initially disk 26 is affixed to reel 11 by reason of prongs 28 fitting into holes 21 and frictionally being engaged thereby. When the tape 12 is wound from reel 11 to reel **11*a*, the disk 26 is pried off reel 11 and installed on the reverse side of reel 11*a***. Hence the tape may be continuously identified regardless of which reel carries the same.

Figure 2:
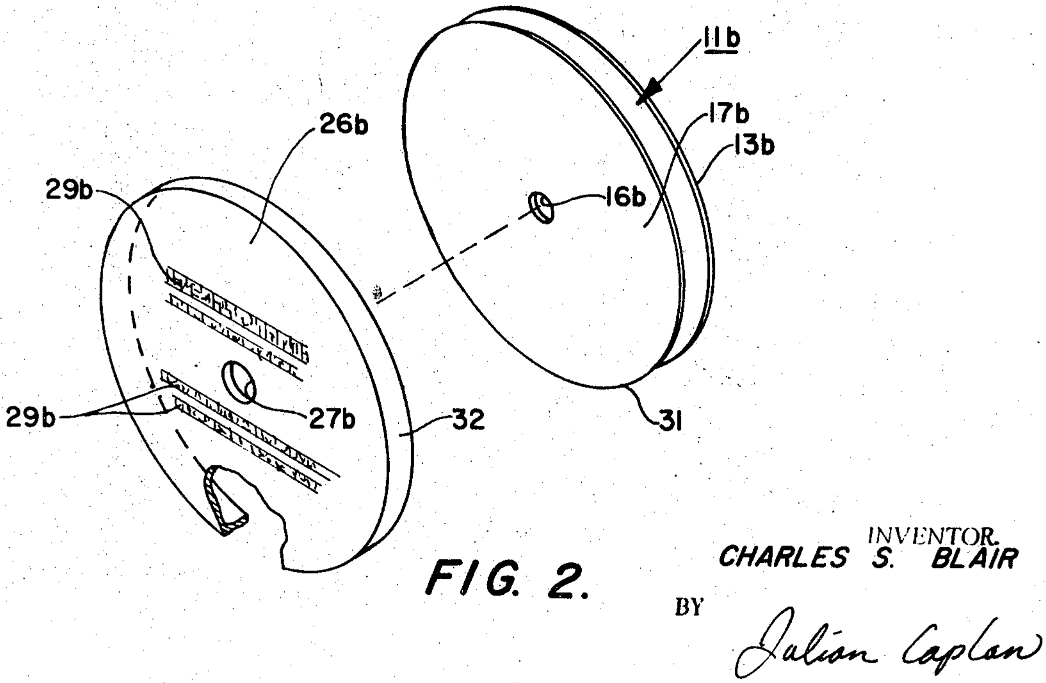
FIG. 2 is an exploded perspective view of a modification.

In FIG. 2, reel **11*b* is illustrated. As shown, the construction of reel 11*b* is simplified over that of reel 11. Thus each side 13*b* is merely formed with a central aperture 16*b*. The periphery 31 of side 13*b* is of standard outside diameter. It will be understood, however, that although the disk 11*b* differs in details of construction over that shown in FIG. 1, nevertheless the invention illustrated in FIG. 2 may be used with the identical disk shown in FIG. 1. Disk 26*b* is the same size as the side 13*b* of reel 11*b* and is formed with a central aperture 27*b* which registers with aperture 16*b*. Around the periphery of disk 26*b* is an inwardly turned cylindrical flange 32, having an inside diameter which frictionally fits over the periphery of rim 31. Disk 26*b* carries indicia 29*b*** similar to that described in the preceding modification.

In use, in FIG. 2, the flange 32 is frictionally slipped over the periphery 31 of side **13*b*. When the tape has been transferred from one reel to the other, the disk 26*b*** is merely slipped onto the other reel (not shown).

Although the foregoing invention has been described in some detail, by way of illustration and example for purposes of clarity of understanding, it is understood that certain changes and modifications may be practiced within the spirit of the invention and scope of the appended claim.

What is claimed is:

1. In combination, a tape reel having circular sides and a central spool, at least one of said sides formed with angularly spaced holes, and a tape reel identifying device comprising a disk having indicia thereon and formed with an aperture for a recorder spindle, and a plurality of prongs on said disk remote from said aperture positioned to fit into said holes and of a size to frictionally engage the margins of said holes for detachably adhering said disk to a tape reel.

References Cited

UNITED STATES PATENTS

| | | | |
|---|---|---|---|
| 1,414,830 | 5/1922 | Reilly | 40—309 |
| 1,601,844 | 10/1926 | Blackmore | 40—20A |
| 2,802,290 | 8/1957 | Carey | 40—2 |
| 2,851,801 | 9/1958 | Jennings | 40—309 |
| 2,859,547 | 11/1958 | Davidson et al. | 40—309 |

OTHER REFERENCES

IBM Technical Bulletin, vol. 7, No. 6, for Nov. 6, 1964, p. 524.

JEROME SCHNALL, Primary Examiner

W. J. CONTRERAS, Assistant Examiner

U.S. Cl. X.R.

40—10